（12） United States Patent
Chen

(10) Patent No.: US 11,113,512 B2
(45) Date of Patent: Sep. 7, 2021

(54) ATTENDANCE MONITORING METHOD, SYSTEM AND APPARATUS FOR TEACHER DURING CLASS

(71) Applicant: Hangzhou Hikvision System Technology Co., Ltd., Zhejiang (CN)

(72) Inventor: Denghang Chen, Zhejiang (CN)

(73) Assignee: Hangzhou Hikvision System Technology Co., Ltd.

(\*) Notice: Subject to any disclaimer, the term of this patent is extended or adjusted under 35 U.S.C. 154(b) by 215 days.

(21) Appl. No.: 16/309,079

(22) PCT Filed: Mar. 30, 2017

(86) PCT No.: PCT/CN2017/078781
§ 371 (c)(1),
(2) Date: Dec. 11, 2018

(87) PCT Pub. No.: WO2017/215315
PCT Pub. Date: Dec. 21, 2017

(65) Prior Publication Data
US 2019/0130174 A1 May 2, 2019

(30) Foreign Application Priority Data
Jun. 12, 2016 (CN) .......................... 201610409161.5

(51) Int. Cl.
*G06K 9/00* (2006.01)
*G06Q 10/10* (2012.01)
*G06Q 50/20* (2012.01)

(52) U.S. Cl.
CPC ........... *G06K 9/00288* (2013.01); *G06K 9/00* (2013.01); *G06K 9/00228* (2013.01); *G06Q 10/1091* (2013.01); *G06Q 50/205* (2013.01)

(58) Field of Classification Search
CPC ......... G06Q 10/1091; G06Q 10/06398; G06Q 50/205; G06Q 10/10; G06Q 50/20;
(Continued)

(56) References Cited

U.S. PATENT DOCUMENTS

2006/0035205 A1\* 2/2006 Dobson .................... G07C 9/28
434/350
2006/0158307 A1 7/2006 Lee et al.
(Continued)

FOREIGN PATENT DOCUMENTS

CN 101685554 A 3/2010
CN 101 819 687 9/2010
(Continued)

OTHER PUBLICATIONS

Gary Friedmand, "The Complete Guide to Sony's Cyber-Shot RX-100 (B&W Edition)", Nov. 5, 2012, lulu.com, XP055582022, isbn: 978-1-300-29476-4, pp. ToC, 105-108, 259.
(Continued)

*Primary Examiner* — Margaret G Mastrodonato
(74) *Attorney, Agent, or Firm* — McDonnell Boehnen Hulbert & Berghoff LLP

(57) ABSTRACT

Embodiments of the present application disclose a method, a system and an apparatus for monitoring attendance of a teacher in class, so as to simplify the process of monitoring the attendance of the teacher and to ensure the accuracy and efficiency of acquiring the attendance of the teacher. The method comprises: acquiring an image of the platform area captured by the image capture device installed in the classroom during at least one time period of any one of class hours; determining whether a face image is contained in the image; if the face image is contained in the image, acquiring at least one picture by the image capture device; for each picture, based on a similarity between a to-be-recognized
(Continued)

face image in this picture and an image in a face comparison database, determining an attendance result of the teacher corresponding to the classroom during this time period; and, based on the attendance result of the teacher corresponding to this classroom during each of the time periods, determining the attendance result of the teacher corresponding to this classroom during this class hour.

12 Claims, 2 Drawing Sheets

(58) Field of Classification Search
CPC ........... G06K 9/00228; G06K 9/00288; G06K 9/00221; G06K 9/78
See application file for complete search history.

(56) References Cited

U.S. PATENT DOCUMENTS

| | | | | |
|---|---|---|---|---|
| 2013/0057713 | A1* | 3/2013 | Khawand | H04N 5/23258 348/208.1 |
| 2013/0326613 | A1* | 12/2013 | Kochanski | G06F 21/32 726/19 |
| 2015/0120362 | A1* | 4/2015 | Whorley, Jr. | G06Q 50/205 705/7.19 |
| 2015/0356345 | A1 | 12/2015 | Velozo et al. | |
| 2016/0203699 | A1* | 7/2016 | Mulhern | G08B 5/22 340/573.1 |

FOREIGN PATENT DOCUMENTS

| | | |
|---|---|---|
| CN | 105 205 646 | 12/2014 |
| CN | 104282049 A | 1/2015 |
| CN | 104 517 102 | 4/2015 |
| CN | 104 732 601 | 6/2015 |
| CN | 105336011 A | 2/2016 |
| CN | 105373981 A | 3/2016 |
| CN | 105 139 470 | 2/2018 |
| JP | 2012-043389 A | 3/2012 |
| JP | 2013 029954 | 2/2013 |
| KR | 10-0703693 B1 | 4/2007 |
| KR | 100 989 142 | 10/2010 |

OTHER PUBLICATIONS

Michael Miller, "Facebook for Grown-Ups: Use Facebook to Reconnect with Old Friends, Family, and Co-Workers (2nd Edition)", Dec. 30, 2011, Que Publishing, XP055582025, ISBN: 978-0-7897-4902-4, pp. ToC, 132-133.
International Search Report dated Jun. 7, 2017, issued in connection with International Application No. PCT/CN2017/078781 filed on Mar. 30, 2017, 4 pages.
Written Opinion dated Jun. 7, 2017, issued in connection with International Application No. PCT/CN2017/078781 filed on Mar. 30, 2017, 3 pages.
Li et al., "Handbook of Face Recognition", Springer-Verlag London Limited, London, UK, 2011, 153 pages.
Shimonski et al., "Cyber Reconnaissance, Surveillance and Defense", Syngress, 2014, 152 pages.
Moeslund et al., "Visual Analysis of Humans: Looking at People", Springer, London, 2011, 210 pages.
Belbachir; Ahmed Nabil, "Smart Cameras", Springer, New York, 2009, 114 pages.
Wikipedia, "Closed-circuit television", 2016, 22 pages, https://en.wikipedia.org/w/index.php?title=Closed-circuit_television&oldid=724417835.

* cited by examiner

ATTENDANCE MONITORING METHOD, SYSTEM AND APPARATUS FOR TEACHER DURING CLASS

The present application is a US national phase under 35 U.S.C. § 371 of international application PCT/CN2017/078781, filed Mar. 30, 2017, which claims priority to Chinese Patent Application No. 201610409161.5, filed with the China National Intellectual Property Administration on Jun. 12, 2016 and entitled "ATTENDANCE MONITORING METHOD, SYSTEM AND APPARATUS FOR TEACHER DURING CLASS", which is incorporated into the present application by reference in their entirety.

TECHNICAL FIELD

The present application relates to the technology field of image processing, and in particular, to a method, a system and an apparatus for monitoring attendance of a teacher in class.

BACKGROUND

Attendance system is the core tool of human resource management in enterprises, schools and other units. For enterprises, the application of attendance system is often linked to personnel performance and salary, so the attendance system is highly valued by managers at all levels. For schools, the attendance data is very important to students and teachers, and is an important basis for the evaluation of students and teachers.

In the prior art, in the case of monitoring the attendance of a teacher, an image capture device is generally installed in each of classrooms, and an image of the environment in the classroom are acquired by the image capture device. If a monitoring personnel wants to monitor the attendance of a teacher A, it is necessary to determine which classroom the teacher is currently attending, so as to retrieve the image of the environment in the classroom and monitor the attendance of the teacher in class based on: whether there is a teacher in the image, and when there is a teacher in the image, it is also necessary to determine whether the teacher is the teacher A.

The method of determining the attendance of the teacher by the manual operation of the monitoring personnel is cumbersome. In addition, due to the problems of the blind angle of the video and the contingency of capturing image, there may be no image of the teacher in the retrieved image, thus resulting in a judgment error; or, because the definition of the image capture device is not enough, only the image is enlarged to distinguish whether the teacher in the class is correct. At the same time, in the above-described monitoring solution, it is also necessary for the monitoring personnel to know each of teachers to determine whether the teacher in class is correct and to have a relatively good understanding of the course information associated with each of teachers, resulting in relatively poor operability and relatively high requirements for the monitoring personnel, thus the accuracy of monitoring and the efficiency of monitoring cannot be effectively considered simultaneously.

SUMMARY

Embodiments of the present application disclose a method, a system and an apparatus for monitoring attendance of a teacher in class, so as to simplify the process of monitoring the attendance of the teacher and to ensure the accuracy and efficiency of acquiring the attendance of the teacher.

In a first aspect, the embodiment of the present application discloses a method for monitoring attendance of a teacher in class, wherein, an image capture device is installed in a classroom, an image capture area of the image capture device comprises a platform area of the classroom, and any one of class hours corresponding to the classroom is divided into a plurality of time periods. The method includes:

acquiring an image of the platform area captured by the image capture device installed in the classroom during at least one time period of one class hour;

determining whether a face image is contained in the image; if a face image is contained in the image, acquiring at least one picture by the image capture device; and determining, for each picture, an attendance result of the teacher corresponding to the classroom during this time period based on a similarity between a to-be-recognized face image in this picture and an image in a face comparison database;

determining an attendance result of the teacher corresponding to this classroom during this class hour based on the attendance result of the teacher corresponding to this classroom during each of the time periods.

Optionally, determining, for each picture, an attendance result of the teacher corresponding to the classroom during this time period based on a similarity between a to-be-recognized face image in this picture and an image in a face comparison database includes:

acquiring, from the face comparison database, the image of the teacher who is course-scheduled in this classroom during this class hour;

determining, for each picture, whether the similarity between the to-be-recognized face image in the picture and the acquired image is greater than a predetermined similarity threshold; and if the similarity between the to-be-recognized face image in the picture and the acquired image is greater than the predetermined similarity threshold, increasing the number of recorded pictures by 1;

determining whether the number of the recorded pictures is greater than a set number threshold; if the number of the recorded pictures is greater than the set number threshold, determining that the attendance of the teacher corresponding to this classroom during this time period is normal; otherwise, determining that the attendance of the teacher corresponding to this classroom during this time period is abnormal.

Optionally, determining, for each picture, an attendance result of the teacher corresponding to the classroom during this time period based on a similarity between a to-be-recognized face image in this picture and an image in a face comparison database includes:

acquiring, from the face comparison database, the image of the teacher who is course-scheduled in this classroom during this class hour;

determining the similarity between the to-be-recognized face image in each picture and the acquired image, and determining a maximum value of the similarity;

determining whether the maximum value of the similarity is greater than a predetermined similarity threshold; and if the maximum value of the similarity is greater than the predetermined similarity threshold, determining that the attendance of the teacher corresponding to this classroom during this time period is normal; otherwise, determining that the attendance of the teacher corresponding to this classroom during this time period is abnormal.

Optionally, acquiring, from the face comparison database, the image of the teacher who is course-scheduled in this classroom during this class hour includes:

retrieving a pre-saved course information of this classroom; wherein, a name or serial number of the teacher who is course-scheduled during each of class hours is recorded in this course information;

acquiring, form the face comparison database, the image corresponding to this teacher who is course-scheduled in this classroom based on the retrieved name or serial number of the teacher who is course-scheduled during this class hour in this classroom.

Optionally, the method further includes:

decreasing the similarity threshold when it is determined that the attendance of the teacher corresponding to this classroom during this time period or this class hour is abnormal, and the attendance result of the teacher corresponding to this classroom during this time period or this class hour is corrected;

increasing the similarity threshold when it is determined that the attendance of the teacher corresponding to this classroom during this time period or this class hour is normal, and the attendance result of the teacher corresponding to this classroom during this time period or this class hour is not corrected, or the similarity between the to-be-recognized face image in each picture and the acquired image is greater than the similarity threshold.

Optionally, decreasing the similarity threshold includes:

decreasing the similarity threshold based on a set first proportionality coefficient;

determining whether the decreased similarity threshold is lower than a preset minimum threshold; and if the decreased similarity threshold is lower than the preset minimum threshold, adjusting the similarity threshold to the minimum threshold; or determining a minimum value of the similarity between the to-be-recognized face image in each of the pictures and the image of the teacher who is course-scheduled in this classroom during this class hour; determining whether the minimum value is lower than the preset minimum threshold, and if the minimum value is not lower than the preset minimum threshold, adjusting the similarity threshold to the minimum value;

increasing the similarity threshold includes:

increasing the similarity threshold based on a set second proportionality coefficient;

determining whether the increased similarity threshold is greater than a preset maximum threshold; and if the increased similarity threshold is greater than the preset maximum threshold, adjusting the similarity threshold to the maximum threshold; or determining the minimum value of the similarity between the to-be-recognized face image in each of the pictures and the image of the teacher who is course-scheduled in this classroom during this class hour; determining whether the minimum value is higher than the preset maximum threshold, and if the minimum value is higher than the preset maximum threshold, adjusting the similarity threshold to the minimum value.

Optionally, determining an attendance result of the teacher corresponding to this classroom during this class hour based on the attendance result of the teacher corresponding to this classroom during each of the time periods includes:

determining whether there is a time period during which the attendance is abnormal;

if there is not a time period during which the attendance is abnormal, determining that the attendance of the teacher corresponding to this classroom during this class hour is normal; if there is the time period during which the attendance is abnormal, determining a type of abnormality of the attendance of the teacher corresponding to this classroom during this class hour based on the time period during which the attendance is abnormal.

Optionally, determining a type of abnormality of the attendance of the teacher corresponding to this classroom during this class hour based on the time period during which the attendance is abnormal includes:

determining that the type of abnormality of the attendance is a failure to attend class on time when the time period during which the attendance is abnormal is the first time period during the class hour;

determining that the type of abnormality of the attendance is dismissing the class early when the time period during which the attendance is abnormal is the last time period during the class hour;

determining that the type of abnormality of the attendance is leaving halfway when the time period during which the attendance is abnormal is neither the first time period or the last time period during the class hour.

Optionally, when, for any one of the time periods, it is determined in a first round that the attendance of the teacher corresponding to this classroom during this time period is abnormal, the method further includes: repeatedly preforming the following steps one or more times, and determining whether the number of cases that the attendance result during this time period is abnormal is greater than a preset threshold; if the number of cases that the attendance result during this time period is abnormal is greater than the preset threshold, determining ultimately that the attendance of the teacher corresponding to this classroom during this time period is abnormal:

acquiring, during this time period, an image captured by the image capture device again; determining whether a face image is contained in the image; if a face image is contained in the image, acquiring at least one picture by the image capture device; and determining, for each picture, whether the attendance result of the teacher corresponding to the classroom during this time period is normal based on the similarity between the to-be-recognized face image in this picture and the image in the face comparison database.

Optionally, when the image capture device is a tracking ball, the method further includes:

determining, at the beginning of each of the time periods, whether the tracking ball is in a stationary state; and if the tracking ball is in the stationary state, acquiring the captured image.

In a second aspect, the embodiment of the present application discloses an apparatus for monitoring attendance of a teacher in class, wherein, an image capture device is installed in a classroom, an image capture area of the image capture device comprises a platform area of the classroom, and any one of class hours corresponding to the classroom is divided into a plurality of time periods. The apparatus includes:

an acquisition module, configured for acquiring an image of the platform area captured by the image capture device installed in the classroom during at least one time period of one class hour;

a processing module, configured for determining whether a face image is contained in the image; if a face image is contained in the image, acquiring at least one picture by the image capture device; and determining, for each picture, an attendance result of the teacher corresponding to the classroom during this time period based on a similarity between a to-be-recognized face image in this picture and an image in a face comparison database;

a determining module, configured for determining an attendance result of the teacher corresponding to this classroom during this class hour based on the attendance result of the teacher corresponding to this classroom during each of the time periods.

Optionally, the processing module includes:

an acquisition sub-module, configured for acquiring, from the face comparison database, the image of the teacher who is course-scheduled in this classroom during this class hour;

a processing sub-module, configured for determining, for each picture, whether the similarity between the to-be-recognized face image in the picture and the acquired image is greater than a predetermined similarity threshold; and if the similarity between the to-be-recognized face image in the picture and the acquired image is greater than the predetermined similarity threshold, increasing the number of recorded pictures by 1;

a first determining sub-module, configured for determining whether the number of the recorded pictures is greater than a set number threshold; if the number of the recorded pictures is greater than the set number threshold, determining that the attendance of the teacher corresponding to this classroom during this time period is normal; otherwise, determining that the attendance of the teacher corresponding to this classroom during this time period is abnormal.

Optionally, the processing module includes:

an acquisition sub-module, configured for acquiring, from the face comparison database, the image of the teacher who is course-scheduled in this classroom during this class hour;

a determining sub-module, configured for determining the similarity between the to-be-recognized face image in each picture and the acquired image, and determining a maximum value of the similarity;

a second determining sub-module, configured for determining whether the maximum value of the similarity is greater than a predetermined similarity threshold; and if the maximum value of the similarity is greater than the predetermined similarity threshold, determining that the attendance of the teacher corresponding to this classroom during this time period is normal; otherwise, determining that the attendance of the teacher corresponding to this classroom during this time period is abnormal.

Optionally, the acquisition sub-module is specifically configured for retrieving a pre-saved course information of this classroom; wherein, a name or serial number of the teacher who is course-scheduled during each of class hours is recorded in this course information; and acquiring, form the face comparison database, the image corresponding to this teacher who is course-scheduled in this classroom based on the retrieved name or serial number of the teacher who is course-scheduled during this class hour in this classroom.

Optionally, the apparatus further includes:

a decreasing module, configured for decreasing the similarity threshold when it is determined that the attendance of the teacher corresponding to this classroom during this time period or this class hour is abnormal, and the attendance result of the teacher corresponding to this classroom during this time period or this class hour is corrected;

an increasing module, configured for increasing the similarity threshold when it is determined that the attendance of the teacher corresponding to this classroom during this time period or this class hour is normal, and the attendance result of the teacher corresponding to this classroom during this time period or this class hour is not corrected, or the similarity between the to-be-recognized face image in each picture and the acquired image is greater than the similarity threshold.

Optionally, the decreasing module is specifically configured for decreasing the similarity threshold based on a set first proportionality coefficient; determining whether the decreased similarity threshold is lower than a preset minimum threshold; and if the decreased similarity threshold is lower than the preset minimum threshold, adjusting the similarity threshold to the minimum threshold; or determining a minimum value of the similarity between the to-be-recognized face image in each of the pictures and the image of the teacher who is course-scheduled in this classroom during this class hour; determining whether the minimum value is lower than the preset minimum threshold, and if the minimum value is not lower than the preset minimum threshold, adjusting the similarity threshold to the minimum value;

the increasing module is specifically configured for increasing the similarity threshold based on a set second proportionality coefficient;

determining whether the increased similarity threshold is greater than a preset maximum threshold; and if the increased similarity threshold is greater than the preset maximum threshold, adjusting the similarity threshold to the maximum threshold; or determining the minimum value of the similarity between the to-be-recognized face image in each of the pictures and the image of the teacher who is course-scheduled in this classroom during this class hour; determining whether the minimum value is higher than the preset maximum threshold, and if the minimum value is higher than the preset maximum threshold, adjusting the similarity threshold to the minimum value.

Optionally, the determining module includes:

a judgment sub-module, configured for determining whether there is a time period during which the attendance is abnormal;

a determining sub-module, configured for, when the judgment result of the judgment sub-module is no, determining that the attendance of the teacher corresponding to this classroom during this class hour is normal; and when the judgment result of the judgment sub-module is yes, determining a type of abnormality of the attendance of the teacher corresponding to this classroom during this class hour based on the time period during which the attendance is abnormal.

Optionally, the determining sub-module is specifically configured for determining that the type of abnormality of the attendance is a failure to attend class on time when the time period during which the attendance is abnormal is the first time period during the class hour; determining that the type of abnormality of the attendance is dismissing the class early when the time period during which the attendance is abnormal is the last time period during the class hour; and determining that the type of abnormality of the attendance is leaving halfway when the time period during which the attendance is abnormal is neither the first time period or the last time period during the class hour.

Optionally, the apparatus further includes:

a preforming module, configured for, when, for any one of the time periods, it is determined in a first round that the attendance of the teacher corresponding to this classroom during this time period is abnormal, repeatedly preforming the following steps one or more times, and determining whether the number of cases that the attendance result during this time period is abnormal is greater than a preset threshold; if the number of cases that the attendance result during this time period is abnormal is greater than the preset threshold, determining ultimately that the attendance of the teacher corresponding to this classroom during this time period is abnormal:

acquiring during this time period, an image captured by the image capture device again; determining whether a face image is contained in the image; if a face image is contained in the image, acquiring at least one picture by the image capture device; and determining, for each picture, whether the attendance result of the teacher corresponding to the classroom during this time period is normal based on the similarity between the to-be-recognized face image in this picture and the image in the face comparison database.

Optionally, when the image capture device is a tracking ball, the processing module is further configured for determining, at the beginning of each of the time periods, whether the tracking ball is in a stationary state; and if the tracking ball is in the stationary state, acquiring the captured image.

In a third aspect, the embodiment of the present application discloses a system for monitoring attendance of a teacher in class. The system includes an image capture device that is installed in a classroom and the apparatus for monitoring attendance of a teacher in class in the above-described second aspect.

In a forth aspect, the present application provides a storage medium; wherein, the storage medium is configured for storing executable program codes; wherein, the executable program codes are configured for, when being executed, implementing the method for monitoring attendance of a teacher in class in the above-described first aspect.

In a fifth aspect, the present application provides an application program; wherein, the application program is configured for, when being executed, implementing the method for monitoring attendance of a teacher in class in the above-described first aspect.

In a sixth aspect, the present application provides an electronic device, including:

a processor, a memory, a communication interface and a communication bus; wherein the processor, the memory, and the communication interface are connected and communicate with each other via the communication bus;

the memory stores executable program codes;

the processor executes a program corresponding to executable program codes by reading the executable program codes stored in the memory to implement the method for monitoring attendance of a teacher in class in the above-described first aspect.

The embodiment of the present application provides a method, an apparatus and a system for monitoring attendance of a teacher in class. An image capture device is installed in a classroom, an image capture area of the image capture device includes a platform area of the classroom, and any one of class hours corresponding to this classroom is divided into a plurality of time periods. The method includes: acquiring an image of the platform area captured by the image capture device installed in the classroom during at least one time period of this class hour; determining whether a face image is contained in the image; if the face image is contained in the image, acquiring at least one picture by the image capture device; for each picture, based on a similarity between a to-be-recognized face image in this picture and an image in a face comparison database, determining an attendance result of the teacher corresponding to the classroom during this time period; and, based on the attendance result of the teacher corresponding to this classroom during each of the time periods, determining the attendance result of the teacher corresponding to this classroom during this class hour. In embodiments of the present application, due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during this class hour in a face comparison database, whether the attendance of the teacher who attends class in this classroom during this class hour is normal is determined, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

BRIEF DESCRIPTION OF THE DRAWINGS

In order to more clearly describe the technical solutions the embodiments of the present application and the prior art, drawings that need to be used in embodiments and the prior art will be briefly described below. Obviously, the drawings described below are for only some embodiments of the present application; those skilled in the art can also obtain other drawings based on these drawings without any creative efforts.

DETAILED DESCRIPTION

In order to simplify the operation of monitoring the attendance of the teacher and to improve the efficiency and accuracy of monitoring the attendance of the teacher, embodiments of the present application disclose a method, a system and an apparatus for monitoring attendance of a teacher in class.

The technical solutions in the embodiments of the application will be described clearly and completely below in combination with the accompanying drawings of the embodiments of the application. Obviously, the embodiments described are merely a part of the embodiments of the present application, not all of the embodiments. All other embodiments obtained based on the embodiments of the present application by those skilled in the art without any creative efforts fall into the scope of protection defined by the present application.

Figure 1:
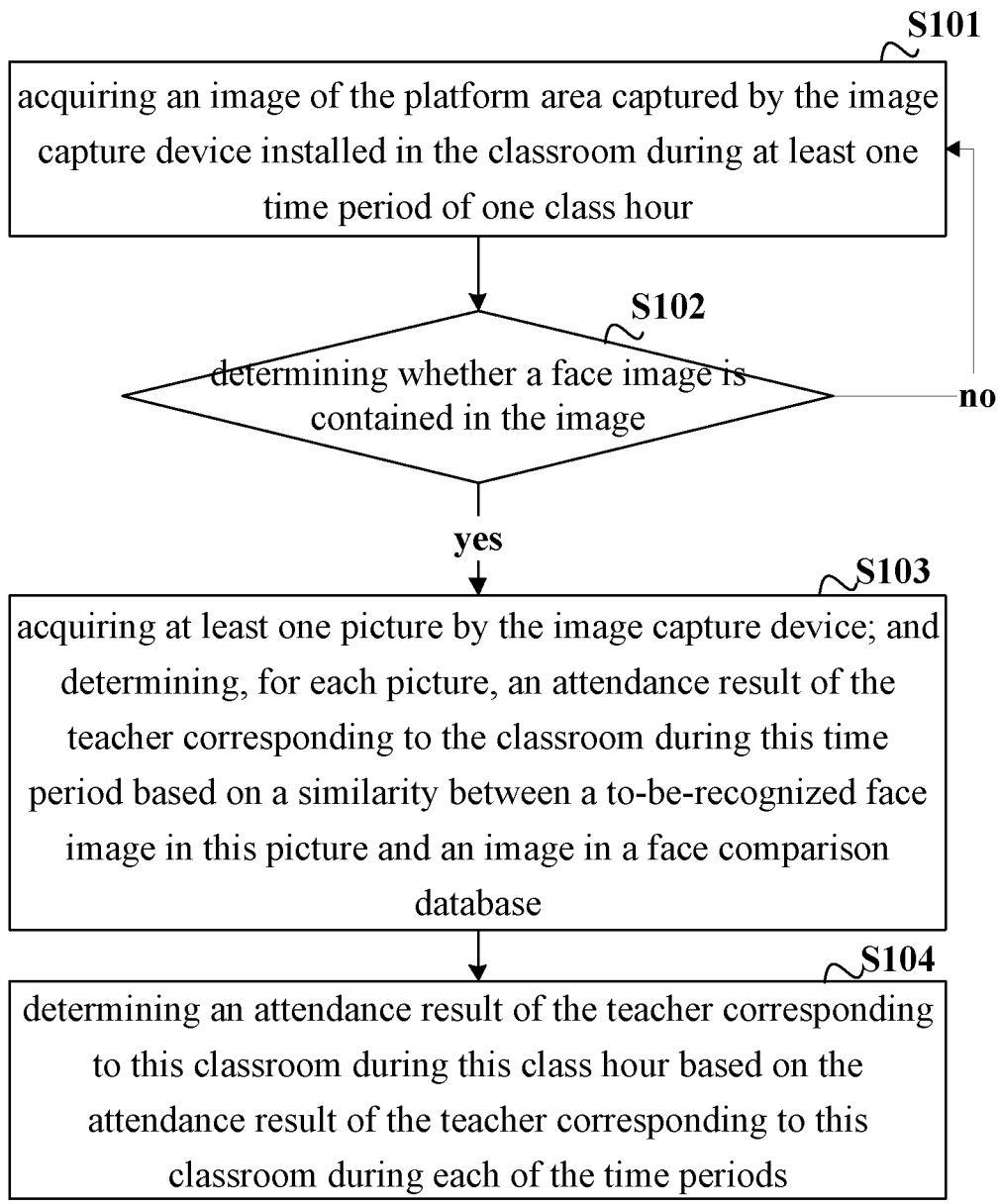
FIG. 1 is a flow chart of a method for monitoring attendance of a teacher in class provided by an embodiment of the present application.

FIG. 1 is a flow chart of a method for monitoring attendance of a teacher in class provided by an embodiment of the present application, and the method may include:

S101: acquiring an image of the platform area captured by the image capture device installed in the classroom during at least one time period of one class hour.

The embodiment of the present application may be applied to an electronic device that may be any device having a recognition monitoring function, such as a server or the like.

In order to implement the monitoring of the attendance of the teacher, in the embodiment of the present application, an image capture device is installed in a classroom, and an image capture area of the image capture device includes a platform area of the classroom. Moreover, this image capture device is connected with the electronic device in wired or wirelessly manner.

It should be noted that, in the embodiment of the present application, that the electronic device monitors any one of classrooms during any one of class hours may be taken as an example, to illustrate the method for monitoring attendance of a teacher in class of the embodiment of the present application. In an actual application, the method provided by the embodiment of the present application may be used to monitor the attendance of the teacher during each class hours in each classroom by the electronic device.

For school, the class times and the quitting times are constant, so time periods corresponding to each class hour are also certain. In order to accurately determine the attendance of the teacher during any class hour, in the embodiment of the present application, this class hour is divided into a plurality of time segments, for example, may be divided into 3, 4 or 5 time periods, etc. By monitoring the attendance corresponding to this classroom during each of the time periods during this class hour, the attendance result of the teacher corresponding to this classroom during this class hour is determined.

When the method provided by the present application is used to monitor the attendance of the teacher during each class hour, the number of time periods into which each class hour is divided may be the same or different, and the length of each time period may be the same or different. Preferably, in order to reduce the workload of the division, each class hour may be divided into the same plurality of time periods; for example, each class hour is equally divided into 4 time periods.

In the embodiment of the present application, during at least one time period of this class hour, the electronic device may acquire the image of the podium area captured by the image capture device installed in the classroom.

S102: determining whether a face image is contained in the image; if the face image is contained in the image, preforming step S103; if the face image is not contained in the image, returning to perform the step of acquiring an image of the platform area captured by the image capture device installed in the classroom in step S101.

Wherein, the process of determining whether a face image is contained in the image may be the prior art, and the embodiment of the present application does not describe this process.

S103: acquiring at least one picture by the image capture device; and determining, for each picture, an attendance result of the teacher corresponding to the classroom during this time period based on a similarity between a to-be-recognized face image in this picture and an image in a face comparison database.

The face comparison database is stored in the local electronic device, and the face image of each teacher is saved in the face comparison database. In the embodiment of the present application, in order to further ensure the accuracy of monitoring the attendance of the teacher, the image capture device captures at least one picture, for example, may capture three, five pictures, etc. The similarity between the to-be-recognized face image in each picture and the image of the corresponding teacher in the face comparison database is determined. If the similarity between the to-be-recognized face image in a certain picture and the image of the teacher who attends class in this classroom during this class hour in the face comparison database is greater than a set similarity threshold, it is determined that the teacher recorded in this picture whose attendance is normal. From at least one picture acquired at the moment, if the number of pictures that record the teacher whose attendance is normal is greater than a set number threshold, it is determined that the teacher recorded in this picture whose attendance is normal.

S104: determining an attendance result of the teacher corresponding to this classroom during this class hour based on the attendance result of the teacher corresponding to this classroom during each of the time periods.

A class hour includes a plurality of time periods, when determining the attendance result of the teacher who attends class in this classroom during this class hour, based on the attendance result of the teacher corresponding to this classroom during each of the time periods, the attendance result of the teacher corresponding to this classroom during this class hour may be determined.

For example, whether the number of time periods during which the attendance is normal is greater than a predetermined threshold may be determined; and if the number of time periods during which the attendance is normal is greater than the predetermined threshold, it may be determined that the attendance of the teacher corresponding to this classroom during this class hour is normal; otherwise, it is determined that the attendance of the teacher corresponding to this classroom during this class hour is abnormal.

In the embodiment of the present application, due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during the class hour in a face comparison database, the similarity information and teacher information are returned. Based on the course information of this classroom, the electronic device determines whether the attendance of the teacher who attends class in this classroom during this class hour is normal, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

In order to realize the monitoring of the attendance of the teacher, an image capture device may be installed in each classroom, an identification information of each image capture device is saved in the electronic device, and the classroom in which the image capture device corresponding to each identification information is located is recorded in the electronic device, that is, The correspondence between the identification information of the image capture device and the classroom to in which it is installed is saved in the electronic device.

In addition, the electronic device further acquires course information that records which teacher attends the class during the time range corresponding to which class hour in each classroom. Of course, if the course information changes for some reason, for example, a certain course of a certain classroom is adjusted to another classroom, or teacher A who attends class during a certain class hour is replaced as teacher B, the changes in these course information also need to be synchronized to the electronic device in time to ensure the accuracy of monitoring the attendance of the corresponding teacher.

A face comparison database is stored in the electronic device. A large number of pictures containing the teacher face images are saved in this face comparison database, and it can be considered that all face data is saved in the face comparison database. In order to realize the monitoring of the attendance of the teacher, in the embodiment of the present application, for each picture saved in the face comparison database, based on the teacher face image contained in this picture, the information of the teacher corresponding to this picture is recorded. This information of the teacher may be the name of the teacher, and also may be the information that is configured for uniquely determining the teacher, such as the job number of the teacher, the serial number of the teacher, etc.

In an optional implementation manner of the embodiment of the present application, when the electronic device acquires a plurality of pictures, for each picture, based on a similarity between a to-be-recognized face image in this picture and an image in a face comparison database, the attendance result of the teacher corresponding to this classroom during this time period is determined, the image of the teacher who is course-scheduled in this classroom during this class hour may be acquired from the face comparison database. Then, for each picture, whether the similarity between the to-be-recognized face image in this picture and the acquired image is greater than a predetermined similarity threshold may be determined, and if the similarity between the to-be-recognized face image in this picture and the acquired image is greater than the predetermined similarity threshold, the number of recorded pictures is increased by 1. Finally, whether the number of the recorded pictures is greater than a set number threshold is determined; and if the number of the recorded pictures is greater than the set number threshold, it is determined that the attendance of the teacher corresponding to this classroom during this time period is normal; otherwise, it is determined that the attendance of the teacher corresponding to this classroom during this time period is abnormal.

In the above-described embodiment of the present application, when the number of recorded pictures is greater than the set number threshold, it is noted that from at least one picture acquired at the moment, the to-be-recognized face image is the image of the teacher who attends class in this classroom during this class hour, then it is determined that the attendance of the teacher at the moment is normal.

For example, when the electronic device acquires 4 pictures, it may correspondingly set the data threshold to 2. For each picture, when determining that the similarity between the to-be-recognized face image in this picture and the acquired image is greater than a predetermined similarity threshold, the number of recorded pictures is increased by 1. After completing the comparison of all the pictures, whether the number of the recorded pictures is greater than the number threshold may be determined; and if the number of the recorded pictures is greater than the number threshold, then it is determined that the attendance of the teacher during this time period is normal.

In another optional implementation manner of the embodiment of the present application, when for each picture, based on a similarity between a to-be-recognized face image in this picture and an image in a face comparison database, determining the attendance result of the teacher corresponding to this classroom during this time period, the electronic device may acquire the image of the teacher who is course-scheduled in this classroom during this class hour from the face comparison database. Then, the electronic device determines the similarity between the to-be-recognized face image in each picture and the acquired image and recognizes a maximum value of the similarity. Finally, the electronic device determines whether the maximum value of the similarity is greater than the predetermined similarity threshold; and if the maximum value of the similarity is greater than the predetermined similarity threshold, the electronic device determines that the attendance of the teacher corresponding to this classroom during this time period is normal, otherwise, determines that the attendance of the teacher corresponding to this classroom during this time period is abnormal.

In the above-described embodiment of the present application, when the maximum value of the similarity is greater than the predetermined similarity threshold, it is noted that from at least one picture acquired at the moment, the to-be-recognized face image is the image of the teacher who attends class in this classroom during this class hour, then it is determined that the attendance of the teacher at the moment is normal.

Wherein, in the above-described embodiment, when the electronic device acquires the image of the teacher who is course-scheduled in this classroom during this class hour from the face comparison database, the electronic device may first retrieves the pre-saved course information of this classroom; wherein, a name or serial number of the teacher who is course-scheduled during each of class hours is recorded in this course information. Then, based on the retrieved name or serial number of the teacher who is course-scheduled during this class hour in this classroom, the electronic device may acquire the image corresponding to this teacher who is course-scheduled form the face comparison database.

In the embodiment of the present application, for each picture saved in the face comparison database, based on the teacher face image contained in this picture, the information of the teacher corresponding to this picture is recorded. This information of the teacher may be the name of the teacher, and also may be the information that is configured for uniquely determining the teacher, such as the job number of the teacher, the serial number of the teacher, etc. Therefore, after knowing the name or number of the teacher who attends class in this classroom during the time hour, the image of the corresponding teacher may be acquired from the face comparison database, that is, the image of the teacher who attends class in this classroom during the time hour.

It can be understood that, in some cases, because definition of the image of each teacher saved in the face comparison database is different, or because of other reasons, the values of the similarities of the to-be-recognized face images in the pictures captured by the image capture device and the acquired images may differ greatly. For example, for partial teachers, each of the similarities between pictures of this teacher captured by the image capture device and the image of this teacher in the face comparison database may be relatively large; and for partial teachers, each of the similarities between pictures of this teacher captured by the image capture device and image of this teacher in the face comparison database may be relatively small.

Therefore, when the attendance result of the teacher is determined based on the similarities between pictures of each teacher and the image of this teacher in the face comparison database, the case where the determination of the attendance result is inaccurate may occur.

When the case where the determination of the attendance result is inaccurate occurs, the attendance result may be corrected by an academic staff based on the actual situation. In this case, in order to improve the accuracy of the subsequent attendance results, based on whether the attendance result of each teacher is corrected, the electronic device may adjust the similarity threshold corresponding to this teacher.

For example, when it is determined that the attendance of the teacher corresponding to this classroom during this time period or this class hour is abnormal, and the attendance result of the teacher corresponding to this classroom during this time period or this class hour is corrected, it is indicated that each of the similarities between pictures of this teacher captured by the image capture device and the image of this teacher in the face comparison database are relatively low. In this case, this similarity threshold may be decreased.

When it is determined that the attendance of the teacher corresponding to this classroom during this time period or this class hour is normal, and the attendance result of the teacher corresponding to this classroom during this time period or this class hour is not corrected, or the similarity between the to-be-recognized face image in each picture and the acquired image is greater than the similarity threshold, it is indicated that each of the similarities between pictures of this teacher captured by the image capture device and the image of this teacher in the face comparison database are relatively high. In this case, this similarity threshold may be increased.

Specifically, decreasing this similarity threshold may include: decreasing this similarity threshold based on a set first proportionality coefficient, such as 2%, 3%, 5%, etc.; or, determining whether the decreased similarity threshold is lower than a preset minimum threshold, such as 60%, 55%, 50%, etc., and if the decreased similarity threshold is lower than the preset minimum threshold, adjusting this similarity threshold to this minimum threshold; or, determining a minimum value of the similarity between the to-be-recognized face image in each of the pictures and the image of the teacher who is course-scheduled in this classroom during this class hour, determining whether the minimum value is lower than the preset minimum threshold, and if the minimum value is not lower than the preset minimum threshold, adjusting this similarity threshold to this minimum value.

Increasing this similarity threshold may include: decreasing this similarity threshold based on a set second proportionality coefficient, such as 2%, 4%, 5%, etc.; or, determining whether the increased similarity threshold is greater than a preset maximum threshold, such as 80%, 85%, 90%, etc., and if the increased similarity threshold is greater than the preset maximum threshold, adjusting this similarity threshold to this maximum threshold; or, determining a minimum value of the similarity between the to-be-recognized face image in each of the pictures and the image of the teacher who is course-scheduled in this classroom during this class hour, determining whether the minimum value is higher than the preset maximum threshold, and if the minimum value is higher than the preset maximum threshold, adjusting this similarity threshold to this minimum value.

As an implementation of the embodiment of the present application, based on the attendance result of the teacher corresponding to this classroom during each of the time periods, determining the attendance result of the teacher corresponding to this classroom during this class hour, may include: determining whether there is a time period during which the attendance is abnormal; if there is not a time period during which the attendance is abnormal, determining that the attendance of the teacher corresponding to this classroom during this class hour is normal; and, if there is the time period during which the attendance is abnormal, based on the time period during which the attendance is abnormal, determining a type of abnormality of the attendance of the teacher corresponding to this classroom during this class hour.

Wherein, based on the time period during which the attendance is abnormal, determining a type of abnormality of the attendance of the teacher corresponding to this classroom during this class hour, includes: when the time period during which the attendance is abnormal is the first time period during the class hour, determining that the type of abnormality of the attendance is a failure to attend class on time; when the time period during which the attendance is abnormal is the last time period during the class hour, determining that dismissing the class early is the type of abnormality of the attendance; and, when the time period during which the attendance is abnormal is neither the first time period or the last time period during the class hour, determining that leaving halfway is the type of abnormality of the attendance.

As an implementation of the embodiment of the present application, in order to improve the accuracy of the attendance result, when for any one of the time periods, it is determined in a first round that the attendance of the teacher corresponding to this classroom during this time period is abnormal, the electronic device further may repeatedly preforming the following steps one or more times, and determining whether the number of cases that the attendance result during this time period is abnormal is greater than a preset threshold, such as 3, 4, 5, etc.; if the number of cases that the attendance result during this time period is abnormal is greater than the preset threshold, determining ultimately that the attendance of the teacher corresponding to this classroom during this time period is abnormal: during this time, acquiring the image captured by the image capture device again; determining whether the face image is contained in the image; if the face image is contained in the image, acquiring at least one picture by the image capture device; and for each picture, based on the similarity between the to-be-recognized face image in this picture and the image in the face comparison database, determining whether the attendance result of the teacher corresponding to the classroom during this time period is normal.

As an implementation of the embodiment of the present application, the above-described image capture device may be a tracking ball. In addition, when the image capture device is the tracking ball, in order to ensure the definition of the captured image, at the beginning of each of the time periods, the electronic device may determines whether the tracking ball is in a stationary state, and if the tracking ball is in the stationary state, acquires the captured image.

Figure 2:
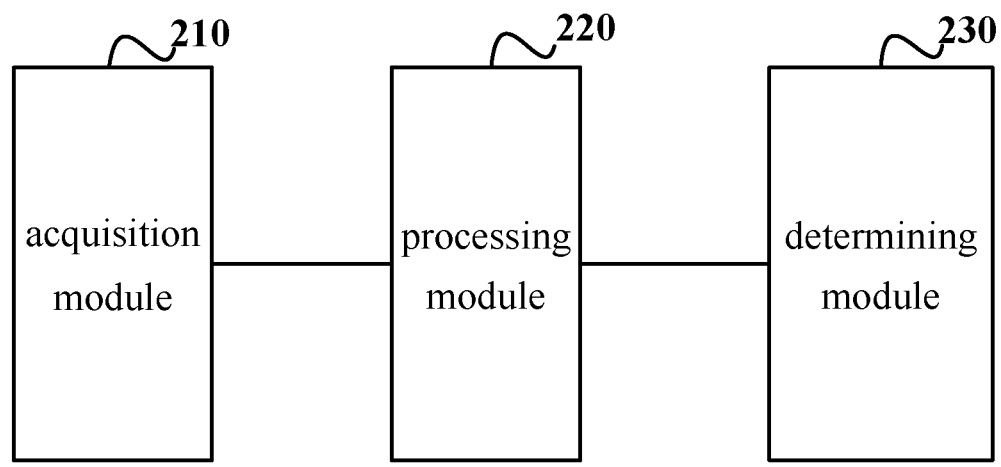
FIG. 2 is a schematic structural diagram of an apparatus for monitoring attendance of a teacher in class provided by an embodiment of the present application.

FIG. 2 is a schematic structural diagram of an apparatus for monitoring attendance of a teacher in class provided by an embodiment of the present application. An image capture device is installed in a classroom, an image capture area of the image capture device includes a platform area of the classroom, and any one of class hours corresponding to the classroom is divided into a plurality of time periods, the method includes:

an acquisition module 210, configured for acquiring an image of the platform area captured by the image capture device installed in the classroom during at least one time period of this class hour;

a processing module 220, configured for determining whether a face image is contained in the image; if the face image is contained in the image, acquiring at least one picture by the image capture device; and for each picture, based on a similarity between a to-be-recognized face image in this picture and an image in a face comparison database, determining an attendance result of the teacher corresponding to the classroom during this time period;

a determining module 230, configured for, based on the attendance result of the teacher corresponding to this classroom during each of the time periods, determining the attendance result of the teacher corresponding to this classroom during this class hour.

The embodiment of the present application provides an apparatus for monitoring attendance of a teacher in class. Due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during this class hour in a face comparison database, whether the attendance of the teacher who attends class in this classroom during this class hour is normal is determined, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

As an implementation of the embodiment of the present application, the processing module 220 includes:

an acquisition sub-module (not shown in the figure), configured for acquiring the image of the teacher who is course-scheduled in this classroom during this class hour from the face comparison database;

a processing sub-module (not shown in the figure), configured for, for each picture, determining whether the similarity between the to-be-recognized face image in this picture and the acquired image is greater than a predetermined similarity threshold; and if the similarity between the to-be-recognized face image in this picture and the acquired image is greater than the predetermined similarity threshold, increasing the number of recorded pictures by 1;

a first determining sub-module (not shown in the figure), configured for determining whether the number of the recorded pictures is greater than a set number threshold; if the number of the recorded pictures is greater than the set number threshold, determining that the attendance of the teacher corresponding to this classroom during this time period is normal; otherwise, determining that the attendance of the teacher corresponding to this classroom during this time period is abnormal.

As an implementation of the embodiment of the present application, the processing module 220 includes:

an acquisition sub-module (not shown in the figure), configured for acquiring the image of the teacher who is course-scheduled in this classroom during this class hour from the face comparison database;

a determining sub-module (not shown in the figure), configured for determining the similarity between the to-be-recognized face image in each picture and the acquired image, and determining a maximum value of the similarity;

a second determining sub-module (not shown in the figure), configured for determining whether the maximum value of the similarity is greater than a predetermined similarity threshold, if the maximum value of the similarity is greater than the predetermined similarity threshold, determining that the attendance of the teacher corresponding to this classroom during this time period is normal; otherwise, determining that the attendance of the teacher corresponding to this classroom during this time period is abnormal.

As an implementation of the embodiment of the present application, the acquisition sub-module is specifically configured for retrieving a pre-saved course information of this classroom; wherein, a name or serial number of the teacher who is course-scheduled during each of class hours is recorded in this course information; and based on the retrieved name or serial number of the teacher who is course-scheduled during this class hour in this classroom, acquiring the image corresponding to this teacher who is course-scheduled form the face comparison database.

As an implementation of the embodiment of the present application, the apparatus further includes:

a decreasing module (not shown in the figure), configured for, when it is determined that the attendance of the teacher corresponding to this classroom during this time period or this class hour is abnormal, and the attendance result of the teacher corresponding to this classroom during this time period or this class hour is corrected, decreasing the similarity threshold;

an increasing module (not shown in the figure), configured for, when it is determined that the attendance of the teacher corresponding to this classroom during this time period or this class hour is normal, and the attendance result of the teacher corresponding to this classroom during this time period or this class hour is not corrected, or the similarity between the to-be-recognized face image in each picture and the acquired image is greater than the similarity threshold, increasing the similarity threshold.

As an implementation of the embodiment of the present application, the decreasing module is specifically configured for decreasing the similarity threshold based on a set first proportionality coefficient; determining whether the decreased similarity threshold is lower than a preset minimum threshold; and if the decreased similarity threshold is lower than the preset minimum threshold, adjusting the similarity threshold to the minimum threshold; or determining a minimum value of the similarity between the to-be-recognized face image in each of the pictures and the image of the teacher who is course-scheduled in this classroom during this class hour; determining whether the minimum value is lower than the preset minimum threshold, and if the minimum value is not lower than the preset minimum threshold, adjusting the similarity threshold to the minimum value;

the increasing module is specifically configured for increasing the similarity threshold based on a set second proportionality coefficient;

determining whether the increased similarity threshold is greater than a preset maximum threshold; and if the increased similarity threshold is greater than the preset maximum threshold, adjusting the similarity threshold to the maximum threshold; or determining the minimum value of the similarity between the to-be-recognized face image in each of the pictures and the image of the teacher who is course-scheduled in this classroom during this class hour; determining whether the minimum value is higher than the preset maximum threshold, and if the minimum value is higher than the preset maximum threshold, adjusting the similarity threshold to the minimum value.

As an implementation of the embodiment of the present application, the determining module 230 includes:

a judgment sub-module (not shown in the figure), configured for determining whether there is a time period during which the attendance is abnormal;

a determining sub-module (not shown in the figure), configured for, when the judgment result of the judgment sub-module is no, determining that the attendance of the teacher corresponding to this classroom during this class hour is normal; and when the judgment result of the judgment sub-module is yes, based on the time period during which the attendance is abnormal, determining a type of abnormality of the attendance of the teacher corresponding to this classroom during this class hour.

As an implementation of the embodiment of the present application, the determining sub-module is specifically configured for, when the time period during which the attendance is abnormal is the first time period during the class hour, determining that the type of abnormality of the attendance is a failure to attend class on time; when the time period during which the attendance is abnormal is the last time period during the class hour, determining that dismissing the class early is the type of abnormality of the attendance; and when the time period during which the attendance is abnormal is neither the first time period or the last time period during the class hour, determining that leaving halfway is the type of abnormality of the attendance.

As an implementation of the embodiment of the present application, the apparatus further includes:

a preforming module (not shown in the figure), configured for, when for any one of the time periods, it is determined in a first round that the attendance of the teacher corresponding to this classroom during this time period is abnormal, repeatedly preforming the following steps one or more times, and determining whether the number of cases that the attendance result during this time period is abnormal is greater than a preset threshold; if the number of cases that the attendance result during this time period is abnormal is greater than the preset threshold, determining ultimately that the attendance of the teacher corresponding to this classroom during this time period is abnormal:

during this time, acquiring the image captured by the image capture device again; determining whether the face image is contained in the image; if the face image is contained in the image, acquiring at least one picture by the image capture device; and for each picture, based on the similarity between the to-be-recognized face image in this picture and the image in the face comparison database, determining whether the attendance result of the teacher corresponding to the classroom during this time period is normal.

As an implementation of the embodiment of the present application, when the image capture device is a tracking ball, the processing module is further configured for, at the beginning of each of the time periods, determining whether the tracking ball is in a stationary state; and if the tracking ball is in the stationary state, acquiring the captured image.

Figure 3:
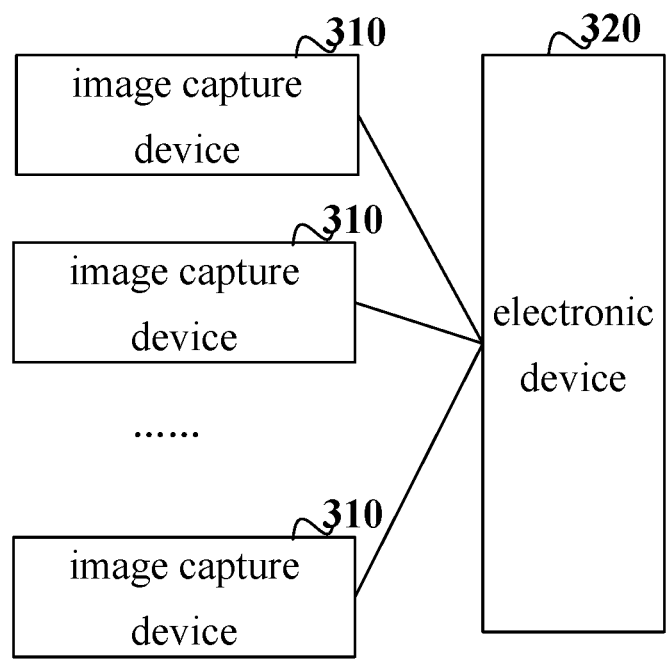
FIG. 3 is a schematic structural diagram of a system for monitoring attendance of a teacher in class provided by an embodiment of the present application.

FIG. 3 is a schematic structural diagram of a system for monitoring attendance of a teacher in class provided by an embodiment of the present application. The system includes an image capture device 310 is installed in a classroom and the apparatus 210 for monitoring attendance of a teacher in class shown in FIG. 2 located in the electronic device 320.

The embodiment of the present application provides a system for monitoring attendance of a teacher in class. Due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during this class hour in a face comparison database, whether the attendance of the teacher who attends class in this classroom during this class hour is normal is determined, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

Correspondingly, the present application further provides a storage medium; wherein the storage medium is configured for storing executable program codes, and the executable program codes are configured for, when being executed, implementing the method for monitoring attendance of a teacher in class described in the present application. Wherein, based on the method for monitoring attendance of a teacher in class described in the present application, an image capture device is installed in a classroom, an image capture area of the image capture device includes a platform area of the classroom, and any one of class hours corresponding to the classroom is divided into a plurality of time periods. The method includes:

acquiring an image of the platform area captured by the image capture device installed in the classroom during at least one time period of this class hour;

determining whether a face image is contained in the image; if the face image is contained in the image, acquiring at least one picture by the image capture device; and for each picture, based on a similarity between a to-be-recognized face image in this picture and an image in a face comparison database, determining an attendance result of the teacher corresponding to the classroom during this time period;

based on the attendance result of the teacher corresponding to this classroom during each of the time periods, determining the attendance result of the teacher corresponding to this classroom during this class hour.

In the embodiment of the present application, due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during this class hour in a face comparison database, whether the attendance of the teacher who attends class in this classroom during this class hour is normal is determined, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

Correspondingly, the present application further provides an application program; wherein the application program is configured for, when being executed, implementing the method for monitoring attendance of a teacher in class described in the present application. Wherein, based on the method for monitoring attendance of a teacher in class described in the present application, an image capture device is installed in a classroom, an image capture area of the image capture device includes a platform area of the classroom, and any one of class hours corresponding to the classroom is divided into a plurality of time periods. The method includes:

acquiring an image of the platform area captured by the image capture device installed in the classroom during at least one time period of this class hour;

determining whether a face image is contained in the image; if the face image is contained in the image, acquiring at least one picture by the image capture device; and for each picture, based on a similarity between a to-be-recognized face image in this picture and an image in a face comparison database, determining an attendance result of the teacher corresponding to the classroom during this time period;

based on the attendance result of the teacher corresponding to this classroom during each of the time periods, determining the attendance result of the teacher corresponding to this classroom during this class hour.

In the embodiment of the present application, due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during this class hour in a face comparison database, whether the attendance of the teacher who attends class in this classroom during this class hour is normal is determined, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

Correspondingly, the present application further provides an electronic device, including:

a processor, a memory, a communication interface and a communication bus; wherein the processor, the memory, and the communication interface are connected and communicate with each other via the communication bus;

the memory stores executable program codes;

the processor executes a program corresponding to executable program codes by reading the executable program codes stored in the memory to implement the method for monitoring attendance of a teacher in class described in the present application.

Wherein, based on the method for monitoring attendance of a teacher in class described in the present application, an image capture device is installed in a classroom, an image capture area of the image capture device includes a platform area of the classroom, and any one of class hours corresponding to the classroom is divided into a plurality of time periods. The method includes:

acquiring an image of the platform area captured by the image capture device installed in the classroom during at least one time period of this class hour;

determining whether a face image is contained in the image; if the face image is contained in the image, acquiring at least one picture by the image capture device; and for each picture, based on a similarity between a to-be-recognized face image in this picture and an image in a face comparison database, determining an attendance result of the teacher corresponding to the classroom during this time period;

based on the attendance result of the teacher corresponding to this classroom during each of the time periods, determining the attendance result of the teacher corresponding to this classroom during this class hour.

In the embodiment of the present application, due to an image capture device is installed in a classroom, and an image capture area of the image capture device includes a platform area of the classroom, when a face image is contained in the image captured by the image capture device, at least one picture is acquired to ensure that the face image of the teacher must be able to be captured and to ensure the accuracy of the subsequent determination of the attendance. When specifically determining, based on the similarity between the face image contained in this at least one picture and an image of the teacher who attends class in this classroom during this class hour in a face comparison database, whether the attendance of the teacher who attends class in this classroom during this class hour is normal is determined, thereby the accuracy of monitoring the attendance of the teacher may be further ensured. Because of the active recognition by the electronic device and without requiring the manual recognition by the experienced staff, thereby the efficiency of monitoring the attendance is effectively improved and the operation of monitoring the attendance is simplified.

The embodiments of an apparatus/a system/a storage medium/an application program/an electronic device are described briefly since they are substantially similar to the embodiment of the method. Related contents can refer to the part that describes the embodiment of the method.

It should be noted that the relationship terms used herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements, but also other elements that is not specifically listed or the elements intrinsic to these processes, methods, articles, or devices. Without further limitations, elements defined by the wording "comprise(s) a/an . . . " do not exclude additional identical elements in the processes, methods, articles, or devices that includes the elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by those with ordinary skills in the art that all or a part of steps in the implementations of the above method may be accomplished by instructing related hardware through programs, which may be stored in a computer-readable storage medium, such as ROM/RAM, a disk, an optical disk, and so on.

The embodiments described above are simply preferred embodiments of the present application, and are not intended to limit the scope of protection of the present application. Any modifications, alternatives, improvements, or the like within the spirit and principle of the present application shall be included in the scope of protection of the present application.

The invention claimed is:

1. A method for monitoring attendance of a teacher in class, wherein, an image capture device is installed in a classroom, an image capture area of the image capture device comprises a platform area of the classroom, and any one of class hours corresponding to the classroom is divided into a plurality of time periods, the method comprises:
   acquiring an image of the platform area captured by the image capture device installed in the classroom during each time period of one class hour;
   determining whether a face image is contained in the image; if a face image is contained in the image, acquiring at least one picture by the image capture device; and determining, for each picture, an attendance result of the teacher corresponding to the classroom during this time period based on a similarity between a to-be-recognized face image in this picture and an image in a face comparison database;
   determining an attendance result of the teacher corresponding to this classroom during this class hour based on the attendance result of the teacher corresponding to this classroom during each of the time periods,
   wherein, determining, for each picture, an attendance result of the teacher corresponding to the classroom during this time period based on a similarity between a to-be-recognized face image in this picture and an image in a face comparison database comprises:
   acquiring, from the face comparison database, the image of the teacher who is course-scheduled in this classroom during this class hour;
   determining, for each picture, whether the similarity between the to-be-recognized face image in the picture and the acquired image is greater than a predetermined similarity threshold; and if the similarity between the to-be-recognized face image in the picture and the acquired image is greater than the predetermined similarity threshold, increasing the number of recorded pictures by 1;
   determining whether the number of the recorded pictures is greater than a set number threshold; if the number of the recorded pictures is greater than the set number threshold, determining that the attendance of the teacher corresponding to this classroom during this time period is normal; otherwise, determining that the attendance of the teacher corresponding to this classroom during this time period is abnormal,
   or
   determining, for each picture, an attendance result of the teacher corresponding to the classroom during this time period based on a similarity between a to-be-recognized face image in this picture and an image in a face comparison database comprises:
   acquiring, from the face comparison database, the image of the teacher who is course-scheduled in this classroom during this class hour;
   determining the similarity between the to-be-recognized face image in each picture and the acquired image, and determining a maximum value of the similarity;
   determining whether the maximum value of the similarity is greater than a predetermined similarity threshold; and if the maximum value of the similarity is greater than the predetermined similarity threshold, determining that the attendance of the teacher corresponding to this classroom during this time period is normal; otherwise, determining that the attendance of the teacher corresponding to this classroom during this time period is abnormal,
   wherein, the method further comprises:
   decreasing the similarity threshold when it is determined that the attendance of the teacher corresponding to this classroom during this time period or this class hour is abnormal, and the attendance result of the teacher corresponding to this classroom during this time period or this class hour is corrected;
   increasing the similarity threshold when it is determined that the attendance of the teacher corresponding to this classroom during this time period or this class hour is normal, and the attendance result of the teacher corresponding to this classroom during this time period or this class hour is not corrected, or the similarity between the to-be-recognized face image in each picture and the acquired image is greater than the similarity threshold, and
   wherein, decreasing the similarity threshold comprises:
   decreasing the similarity threshold based on a set first proportionality coefficient;
   determining whether the decreased similarity threshold is lower than a preset minimum threshold; and if the decreased similarity threshold is lower than the preset minimum threshold, adjusting the similarity threshold to the minimum threshold; or
   determining a minimum value of the similarity between the to-be-recognized face image in each of the pictures and the image of the teacher who is course-scheduled in this classroom during this class hour; determining whether the minimum value is lower than the preset minimum threshold, and if the minimum value is not lower than the preset minimum threshold, adjusting the similarity threshold to the minimum value;
   increasing the similarity threshold, comprises:
   increasing the similarity threshold based on a set second proportionality coefficient
   determining whether the increased similarity threshold is greater than a preset maximum threshold; and if the increased similarity threshold is greater than the preset maximum threshold, adjusting the similarity threshold to the maximum threshold; or
   determining the minimum value of the similarity between the to-be-recognized face image in each of the pictures and the image of the teacher who is course-scheduled in this classroom during this class hour; determining whether the minimum value is higher than the preset maximum threshold, and if the minimum value is higher than the preset maximum threshold, adjusting the similarity threshold to the minimum value.

2. The method of claim 1, wherein, acquiring, from the face comparison database, the image of the teacher who is course-scheduled in this classroom during this class hour comprises:
retrieving a pre-saved course information of this classroom; wherein, a name or serial number of the teacher who is course-scheduled during each of class hours is recorded in this course information;
acquiring, form the face comparison database, the image corresponding to this teacher who is course-scheduled in this classroom based on the retrieved name or serial number of the teacher who is course-scheduled during this class hour in this classroom.

3. The method of claim 1, wherein, determining an attendance result of the teacher corresponding to this classroom during this class hour based on the attendance result of the teacher corresponding to this classroom during each of the time periods comprises:
determining whether there is a time period during which the attendance is abnormal;
if there is not a time period during which the attendance is abnormal, determining that the attendance of the teacher corresponding to this classroom during this class hour is normal; if there is the time period during which the attendance is abnormal, determining a type of abnormality of the attendance of the teacher corresponding to this classroom during this class hour based on the time period during which the attendance is abnormal.

4. The method of claim 3, wherein, determining a type of abnormality of the attendance of the teacher corresponding to this classroom during this class hour based on the time period during which the attendance is abnormal comprises:
determining that the type of abnormality of the attendance is a failure to attend class on time when the time period during which the attendance is abnormal is the first time period during the class hour;
determining that the type of abnormality of the attendance is dismissing the class early when the time period during which the attendance is abnormal is the last time period during the class hour;
determining that the type of abnormality of the attendance is leaving halfway when the time period during which the attendance is abnormal is neither the first time period or the last time period during the class hour.

5. The method of claim 1, wherein, when the image capture device is a tracking ball, the method further comprises:
determining, at the beginning of each of the time periods, whether the tracking ball is in a stationary state; and if the tracking ball is in the stationary state, acquiring the captured image.

6. A non-temporary computer-readable storage medium, configured for storing executable program codes; wherein, the executable program codes are configured for, when being executed, implementing the method for monitoring attendance of a teacher in class of claim 1.

7. An electronic device, comprising:
a processor, a memory, a communication interface and a communication bus; wherein
the processor, the memory, and the communication interface are connected and communicate with each other via the communication bus;
the memory stores executable program codes;
the processor executes a program corresponding to executable program codes by reading the executable program codes stored in the memory to implement the method for monitoring attendance of a teacher in class of claim 1.

8. An apparatus for monitoring attendance of a teacher in class, wherein, an image capture device is installed in a classroom, an image capture area of the image capture device comprises a platform area of the classroom, and any one of class hours corresponding to the classroom is divided into a plurality of time periods, the apparatus comprises:
an acquisition module, configured for acquiring an image of the platform area captured by the image capture device installed in the classroom during each time period of one class hour;
a processing module, configured for determining whether a face image is contained in the image; if a face image is contained in the image, acquiring at least one picture by the image capture device; and determining, for each picture, an attendance result of the teacher corresponding to the classroom during this time period based on a similarity between a to-be-recognized face image in this picture and an image in a face comparison database;
a determining module, configured for determining an attendance result of the teacher corresponding to this classroom during this class hour based on the attendance result of the teacher corresponding to this classroom during each of the time periods,
wherein, the processing module comprises:
an acquisition sub-module, configured for acquiring, from the face comparison database, the image of the teacher who is course-scheduled in this classroom during this class hour;
a processing sub-module, configured for determining, for each picture, whether the similarity between the to-be-recognized face image in the picture and the acquired image is greater than a predetermined similarity threshold; and if the similarity between the to-be-recognized face image in the picture and the acquired image is greater than the predetermined similarity threshold, increasing the number of recorded pictures by 1;
a first determining sub-module, configured for determining whether the number of the recorded pictures is greater than a set number threshold; if the number of the recorded pictures is greater than the set number threshold, determining that the attendance of the teacher corresponding to this classroom during this time period is normal; otherwise, determining that the attendance of the teacher corresponding to this classroom during this time period is abnormal,
or
the processing module comprises:
an acquisition sub-module, configured for acquiring, from the face comparison database, the image of the teacher who is course-scheduled in this classroom during this class hour;
a determining sub-module, configured for determining the similarity between the to-be-recognized face image in each picture and the acquired image, and determining a maximum value of the similarity;
a second determining sub-module, configured for determining whether the maximum value of the similarity is greater than a predetermined similarity threshold; and if the maximum value of the similarity is greater than the predetermined similarity threshold, determining that the attendance of the teacher corresponding to this classroom during this time period is normal; otherwise, determining that the attendance of the teacher corresponding to this classroom during this time period is abnormal, wherein, the apparatus further comprises:

a decreasing module, configured for decreasing the similarity threshold when it is determined that the attendance of the teacher corresponding to this classroom during this time period or this class hour is abnormal, and the attendance result of the teacher corresponding to this classroom during this time period or this class hour is corrected;

an increasing module, configured for increasing the similarity threshold when it is determined that the attendance of the teacher corresponding to this classroom during this time period or this class hour is normal, and the attendance result of the teacher corresponding to this classroom during this time period or this class hour is not corrected, or the similarity between the to-be-recognized face image in each picture and the acquired image is greater than the similarity threshold, and wherein, the decreasing module is configured for decreasing the similarity threshold based on a set first proportionality coefficient determining whether the decreased similarity threshold is lower than a preset minimum threshold; and if the decreased similarity threshold is lower than the preset minimum threshold, adjusting the similarity threshold to the minimum threshold; or determining a minimum value of the similarity between the to-be-recognized face image in each of the pictures and the image of the teacher who is course-scheduled in this classroom during this class hour; determining whether the minimum value is lower than the preset minimum threshold, and if the minimum value is not lower than the preset minimum threshold, adjusting the similarity threshold to the minimum value;

the increasing module is configured for increasing the similarity threshold based on a set second proportionality coefficient;

determining whether the increased similarity threshold is greater than a preset maximum threshold; and if the increased similarity threshold is greater than the preset maximum threshold, adjusting the similarity threshold to the maximum threshold; or determining the minimum value of the similarity between the to-be-recognized face image in each of the pictures and the image of the teacher who is course-scheduled in this classroom during this class hour; determining whether the minimum value is higher than the preset maximum threshold, and if the minimum value is higher than the preset maximum threshold, adjusting the similarity threshold to the minimum value.

9. The apparatus of claim 8, wherein, the acquisition sub-module is configured for retrieving a pre-saved course information of this classroom; wherein, a name or serial number of the teacher who is course-scheduled during each of class hours is recorded in this course information; and acquiring, form the face comparison database, the image corresponding to this teacher who is course-scheduled in this classroom based on the retrieved name or serial number of the teacher who is course-scheduled during this class hour in this classroom.

10. The apparatus of claim 8, wherein, the determining module comprises:

a judgment sub-module, configured for determining whether there is a time period during which the attendance is abnormal;

a determining sub-module, configured for, when the judgment result of the judgment sub-module is no, determining that the attendance of the teacher corresponding to this classroom during this class hour is normal; and when the judgment result of the judgment sub-module is yes, determining a type of abnormality of the attendance of the teacher corresponding to this classroom during this class hour based on the time period during which the attendance is abnormal.

11. The apparatus of claim 10, wherein, the determining sub-module is configured for determining that the type of abnormality of the attendance is a failure to attend class on time when the time period during which the attendance is abnormal is the first time period during the class hour; determining that the type of abnormality of the attendance is dismissing the class early when the time period during which the attendance is abnormal is the last time period during the class hour; and determining that the type of abnormality of the attendance is leaving halfway when the time period during which the attendance is abnormal is neither the first time period or the last time period during the class hour.

12. A system for monitoring attendance of a teacher in class, comprising: an image capture device that is installed in a classroom and the apparatus for monitoring attendance of a teacher in class of claim 8.

* * * * *